US008581904B2

(12) United States Patent
Grose et al.

(10) Patent No.: US 8,581,904 B2
(45) Date of Patent: Nov. 12, 2013

(54) THREE-DIMENSIONAL DISPLAY OF SPECIFICATIONS IN A SCALABLE FEED FORWARD NETWORK

(75) Inventors: David Lee Grose, Poulsbo, WA (US); Thomas E. Sherer, Everett, WA (US); Scott D. Button, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 521 days.

(21) Appl. No.: 12/872,800

(22) Filed: Aug. 31, 2010

(65) Prior Publication Data

US 2012/0050287 A1    Mar. 1, 2012

(51) Int. Cl.
*G06T 17/20* (2006.01)
*G06T 19/00* (2011.01)

(52) U.S. Cl.
USPC .......................................... 345/420; 345/419

(58) Field of Classification Search
None
See application file for complete search history.

(56) References Cited

U.S. PATENT DOCUMENTS

| | | | |
|---|---|---|---|
| 5,461,699 A | 10/1995 | Arbabi et al. | |
| 5,806,056 A | 9/1998 | Khekmatpour | |
| 6,141,776 A | 10/2000 | Grose et al. | |
| 6,154,213 A | 11/2000 | Rennison et al. | |
| 6,220,743 B1 | 4/2001 | Campestre et al. | |
| 6,292,830 B1 | 9/2001 | Taylor et al. | |
| 6,778,863 B1 | 8/2004 | Lienhard et al. | |
| 6,877,153 B2 | 4/2005 | Konnersman | |
| 7,250,944 B2 | 7/2007 | Anderson et al. | |
| 7,373,612 B2 | 5/2008 | Risch et al. | |
| 7,460,984 B1 | 12/2008 | Clark et al. | |
| 7,542,892 B1 | 6/2009 | Clark et al. | |
| 7,873,920 B2 | 1/2011 | Grose | |
| 7,899,768 B2 | 3/2011 | Grose | |
| 2001/0032029 A1 | 10/2001 | Kauffman | |
| 2002/0054117 A1 | 5/2002 | van Dantzich et al. | |
| 2003/0014379 A1 | 1/2003 | Saias et al. | |
| 2004/0088577 A1 | 5/2004 | Render | |
| 2004/0090472 A1 | 5/2004 | Risch et al. | |
| 2005/0076313 A1 | 4/2005 | Pegram et al. | |
| 2005/0096950 A1 | 5/2005 | Caplan et al. | |
| 2005/0180330 A1 | 8/2005 | Shapiro | |
| 2005/0197875 A1 | 9/2005 | Kauffman | |
| 2006/0235658 A1 | 10/2006 | Nitta et al. | |
| 2008/0109475 A1 | 5/2008 | Burmester et al. | |
| 2008/0205280 A1 | 8/2008 | Saphir | |
| 2008/0319719 A1 | 12/2008 | Grose et al. | |
| 2009/0006293 A1 | 1/2009 | Grose et al. | |

OTHER PUBLICATIONS

International Search Report & Written Opinion dated Sep. 7, 2012 in PCT Application No. PCT/US11/45979.
Paananen, Jussi et al., "FORG3D: Force-Directed 3D Graph Editor for Visualization of Integrated Genome Scale Data," BMC Systems Biology, BioMed Central Ltd., LO, vol. 3, No. 1, Feb. 24, 2009.

(Continued)

*Primary Examiner* — Kee M Tung
*Assistant Examiner* — Sing-Wai Wu
(74) *Attorney, Agent, or Firm* — Hope Baldauff, LLC (57) ABSTRACT

Technologies are described herein for generating a three-dimensional display. Some technologies are adapted to retrieve a model defining a feed-forward network related to a development process. The technologies generate a first three-dimensional shape representing each internal product according to the model. The technologies also generate a second three-dimensional shape representing each dependency of each internal product corresponding to each first three-dimensional shape. The technologies further generate a third three-dimensional shape representing each component of each dependency corresponding to each second three-dimensional shape.

14 Claims, 5 Drawing Sheets

(56) References Cited

OTHER PUBLICATIONS

U.S. Office Action dated Feb. 25, 2010 in U.S. Appl. No. 11/771,380.
U.S. Office Action dated Jun. 7, 2010 in U.S. Appl. No. 11/771,380.
U.S. Notice of Allowance dated Nov. 3, 2010 in U.S. Appl. No. 11/771,380.
U.S. Office Action dated Mar. 30, 2010 in U.S. Appl. No. 11/768,098.
U.S. Notice of Allowance dated Sep. 24, 2010 in U.S. Appl. No. 11/768,098.
US Office Action dated Oct. 4, 2012 in U.S. Appl. No. 12/872,746.
Zhang, "Forecasting with Artificial Neural Networks The State of the Art," Jul. 31, 1997, International Journal of Forecasting Elsevier Science B.V., pp. 35-63.
Wikipedia, "Force-Based Algorithms", web page last modified on Aug. 20, 2010, retrieved Aug. 30, 2010 from Wikipedia entry on force-based algorithms, 4 pages.

THREE-DIMENSIONAL DISPLAY OF SPECIFICATIONS IN A SCALABLE FEED FORWARD NETWORK

CROSS-REFERENCE TO RELATED APPLICATIONS

This application is related to U.S. patent application Ser. No. 11/771,380, filed on Jun. 29, 2007, now U.S. Pat. No. 7,899,768, entitled "Methods and Systems for Scalable Hierarchical Feed-Forward Processes," U.S. patent application Ser. No. 11/768,098, now U.S. Pat. No. 7,873,920, filed on Jun. 25, 2007, entitled "Methods and Systems for Displaying Network Information," and U.S. patent application Ser. No. 12/872,746, filed Aug. 31, 2010, entitled "Methods and Systems for Correspondence Pattern Automation of Scalable Feed Forward Processes," which are hereby incorporated by reference in their entirety.

BACKGROUND

Manually developing a complex process for producing a product, such as a commercial aircraft, can be difficult and expensive. Generally, the complex process can be broken down into a hierarchy of individual processes, which generate portions of the product. In the hierarchy, results from lower-level individual processes may aggregate into higher-level individual processes. The highest-level individual processes may eventually produce the completed product.

A large scale model that represents the complex process can be constructed in order to facilitate accurate and efficient production of the product. The large scale model can define the individual processes related to producing at least portions of the product. The large scale model may also define the inputs to and the outputs from each of the individual processes. The large scale model may be utilized to guide the production of the product.

Personnel involved in the development process and others may desire to view a human-readable representation of the large scale model. Various technologies may be available for converting a model into a graphical display suitable for human viewing. Some examples of technologies adapted to visualize models may include network diagrams, Gantt charts, and work breakdown structures. However, these existing approaches may not be suitable for visualizing extremely complex models, such as a large scale model for producing a commercial aircraft. In particular, these existing approaches may need to remove some information from the large scale model in order to present the graphical display in a legible format. However, removing information from the graphical display may create an inaccurate and/or incomplete representation of the large scale model, thereby resulting in a loss of context and understanding.

It is with respect to these and other considerations that the disclosure made herein is presented.

SUMMARY

Technologies are described herein for generating a three-dimensional display of input specifications in a scalable feed forward network. A large scale model may include various input specifications specifying the input to the individual processes related to producing at least portions of the completed product. The three-dimensional display may organize and display the input specifications in a hierarchical manner that can be easily understood by a human viewer.

The three-dimensional display may be configured to retain context and enhance understanding of the nature of the individual processes. The three-dimensional display may be scalable, organize relationships between the individual processes, and create an orderly, modular representation of the large scale model. In this way, the three-dimensional display may enable recognition of similarities as well as differences between different parts of the large scale model.

In order to generate a three-dimensional display, some technologies may be adapted to retrieve a model defining a feed-forward network related to a development process. The technologies may generate a first three-dimensional shape representing each internal product according to the model. The technologies may also generate a second three-dimensional shape representing each dependency of each internal product corresponding to each first three-dimensional shape. The technologies may further generate a third three-dimensional shape representing each component of each dependency corresponding to each second three-dimensional shape.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for generating a three-dimensional display of input specifications in a scalable, nested feed-forward network. Embodiments described herein may provide various technologies adapted to visualize and interact with complex, scalable, feed-forward networks in a human-readable format. These embodiments may include a three-dimensional representation of the network that retains context, and illustrates each detail of the network, including the individual processes contained in each level of a hierarchy and the relationships between the individual processes. The three-dimensional representation may be presented in an intuitive user interface adapted to enable a user to navigate through and visualize the various levels of the hierarchy and enables recognition of similarities and differences within different parts of the network model.

In some embodiments, the three dimensional representation may include rectangular cuboids, cones, and disks. Further embodiments may similarly utilize other three-dimensional shapes. The rectangular cuboids may represent each internal product contained in the network, including various nested levels of product aggregates and aggregated products contained within each product aggregate. The cones may represent each dependency of each internal product corresponding to each rectangular cuboid. For example, the cones may represent internal products, external products, and component inputs. The disks may represent each component of each dependency corresponding to each cone. For example, the disks may represent internal components which are components of the internal products, external components which are components of the external products, and component products which are components of the component inputs. Various directed lines between the rectangular cuboids, the cones, and the disks may represent relationships between the rectangular cuboids, the cones, and the disks.

Figure 5:
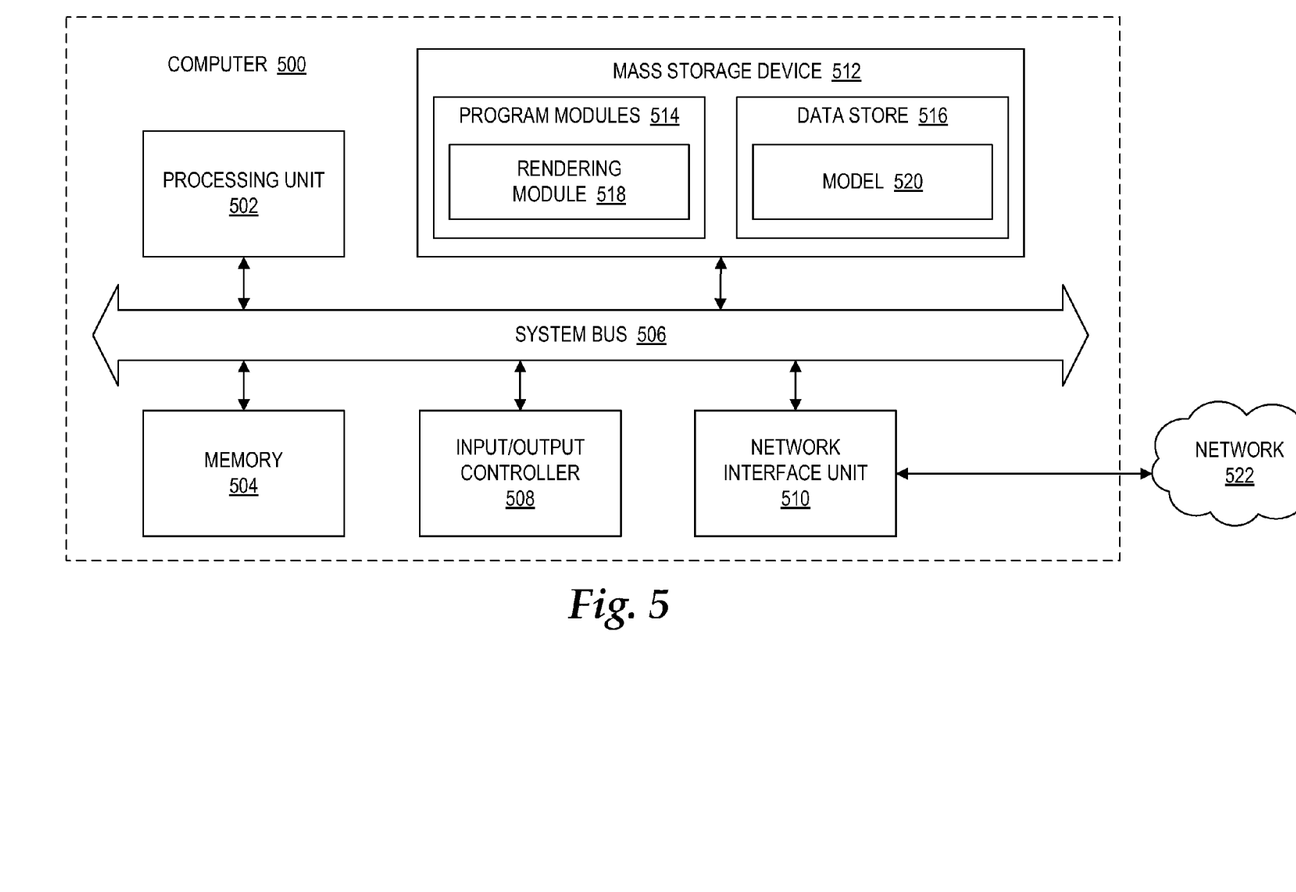
FIG. 5 is a computer architecture diagram showing aspects of an illustrative computer hardware architecture for a computing system capable of implementing aspects of the embodiments presented herein.

A product, including physical products (e.g., objects) and non-physical products (e.g., information), may be described in terms of a hierarchical breakdown (hereinafter referred to as a "hierarchy") of the product's components. A "process" may be adapted to describe the construction of the product by defining tasks and precedences associated with the creation of each component. For example, the precedences may indicate that a particular task should be completed before another task is performed. Example technologies for constructing the process model are described in the above-referenced and incorporated U.S. patent application entitled "Methods and Systems for Scalable Hierarchical Feed-Forward Processes." An example of a process embodied in a process model 520 is illustrated in FIG. 5. The process model may be adapted to maintain a feed-forward constraint such that no cycles or loops are contained within the process model. The process may also be scalable such that the process may be combined with other processes to generate a larger process.

As used herein, a "product" may refer to something input into or produced by a process in the process model. An illustrative process may be a commercial aircraft development process. In one example, a product of the commercial aircraft development process may include an aircraft or a part of the aircraft (e.g., fuselage section, wing, landing gear, engine, etc.). In another example, the product may include a type certificate or other relevant document related to legal use of the aircraft. In yet another example, the product may include a design specification or other dataset related to the design and/or construction of the aircraft. Some other examples of products may include a wing center section, a control column and wheel, an overhead stowage bin, a layout of passenger arrangement, front spar interface loads, and pitching moment curves.

The product may be either an "internal product" or an "external product." The internal product may be produced by a process in the process model. The internal product may receive as input an external product and an internal product. Some examples of internal products in the commercial aircraft development process may include avionics, propulsion systems, and engine specific fuel consumption curves. Each internal product may include multiple "internal inputs," which may be utilized or needed to produce the internal product.

The internal inputs may include "internal components" and "component inputs." The internal components may refer to a subset of non-external inputs that is not part of the same aggregation as the internal product. The component inputs may refer to a subset of non-external inputs that is part of the same aggregation as the internal product. Each component input may include multiple "component products," the aggregate of which form the component input. An illustrative internal product may be a subassembly. For the subassembly, an example component input may be parts of the subassembly, and an example internal component may be a tool that assembles the parts to produce the subassembly. In this case, the parts assemble to form the subassembly. As such, the parts are considered in the same aggregation as the subassembly. In contrast, the tool that assembles the parts is not included within the subassembly. As such, the tool is considered as not part of the same aggregation as the subassembly.

The external product may be produced outside of a process in the process model. In contrast to the internal product, the external product may not receive an input. Some examples of external products in the commercial aircraft development process may include regulatory requirements, customer requirements, company ground rules, and existing facilities. The external product may include multiple components, the aggregate of which forms the external product. Each such component forming the external product may be referred to herein as an "external component." The internal products, the external products, the internal components, the component inputs, and/or the external components may form the set of inputs into a process adapted to produce any given internal product.

Each internal product may be a component. Each component may include multiple nested components, further includes additional nested components at deeper levels of the hierarchy. In the commercial aircraft development process, some examples of components may include technology assessment, exploratory design, conceptual design, preliminary design, production system, infrastructure, detail manufacturing plans, vehicle product, and product validation. The example component "infrastructure" may include a nested component "production facilities," which further includes a nested component "major assemblies." The component "major assemblies" may include a nested component "wing center section," which further includes a nested component "upper panel." Additional nested components may continue from the component "upper panel."

As used herein, an "input" may refer to a product, such as an internal product or an external product, that is utilized or required to produce another product. That is, a statement that a first product is input to second product may refer to the utilization or requirement of the first product to produce the second product. For example, an internal product may be a design specification of an airplane wing. An external product may be specifications of fasteners that are utilized or required in the production of the detailed design. In this case, since the design specification of the airplane wing utilizes or requires the specifications of fasteners, the specifications of fasteners may also be referred to as an external input to the design specification of the airplane wing. According to some embodiments, an internal product can receive an input, but an external product cannot receive an input. Example technologies for selecting the inputs are described in the above-referenced and incorporated U.S. patent application entitled "Methods and Systems for Correspondence Pattern Automation of Scalable Feed Forward Processes."

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, various methodologies for generating a three-dimensional display of input specifications in a scalable, nested feed-forward network. In particular, FIG. 1 is a flow diagram illustrating an example method 100 provided herein for generating a three-dimensional display, in accordance with some embodiments.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 1:
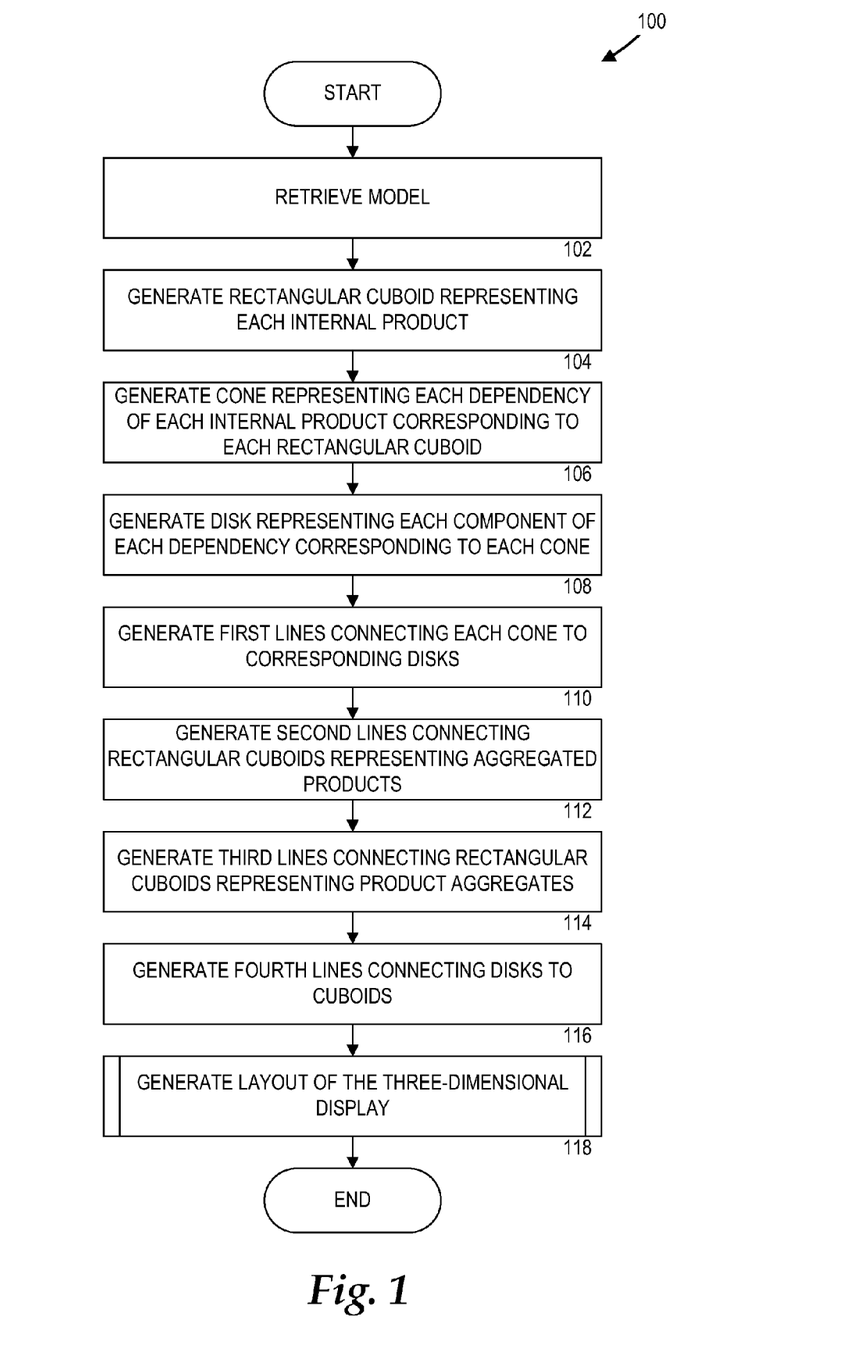
FIG. 1 is a flow diagram illustrating an example method for generating a three-dimensional display, in accordance with some embodiments.

Referring now to FIG. 1, the method 100 begins at operation 102, where a computational unit, such as a rendering module 518 illustrated in FIG. 5, retrieves a model, such as the process model 520. The process model 520 may define a scalable, nested, feed-forward network related to a complex development process. The network may contain internal products at various levels of a hierarchy (e.g., multiple lower level products may form an aggregate higher level product). The process model 520 may also define physical and/or logical dependencies between the products. Operations 104-118 may be performed in accordance with information contained in the process model 520. When the rendering module 518 retrieves the process model 520, the method 100 may proceed to operation 104.

At operation 104, the rendering module 518 may generate a first three-dimensional shape, such as a rectangular cuboid, adapted to represent each internal product within the process model 520, according to the process model 520. As previously described, the process model 520 may define a network, which contains internal products at various levels of a hierarchy. At each level of the hierarchy, internal products may include components, including product aggregates and aggregated products contained within each product aggregate. Thus, each product aggregate and aggregated product may be associated with a corresponding rectangular cuboid. Each rectangular cuboid corresponding to each product aggregate may include multiple nested rectangular cuboids corresponding to the aggregated products. When the rendering module 518 generates a rectangular cuboid adapted to represent each internal product in the process model 520, the method 100 may proceed to operation 106.

At operation 106, the rendering module 518 may generate a second three-dimensional shape, such as a cone, adapted to represent each dependency of each internal product corresponding to each rectangular cuboid, according to the process model 520. As used herein, a "dependency" may refer to a product that is utilized or required for the production of a product represented by a rectangular cuboid. For example, an external product and an internal product may be utilized or required for the production of a given product aggregate. In this case, the external product and the internal product may be referred to as dependencies of the product aggregate. Thus, the product aggregate may be represented by a rectangular cuboid, and the external product and the internal product utilized or required for the production of the product aggregate may be represented by respective cones. When the rendering module 518 generates a cone adapted to represent each dependency of each internal product corresponding to each rectangular cuboid, the method 100 may proceed to operation 108.

At operation 108, the rendering module 518 may generate a third three-dimensional shape, such as a disk-shaped cylinder (hereinafter referred to as a "disk"), adapted to represent each component of each dependency corresponding to each cone, according to the process model 520. In one example, an internal product may include multiple internal components which are components of the internal product. In another example, an external product may include multiple external components which are components of the external product. In yet another example, a component product may include multiple component inputs which are components of the component product. In these cases, each internal component, each external component, and each component product may be represented by a disk. When the rendering module 518 generates a disk adapted to represent each component of each dependency corresponding to each cone, the method 100 may proceed to operation 110.

At operation 110, the rendering module 518 may generate a first set of lines (hereinafter referred to as first lines), each of which connects each cone to the corresponding disks of the cone for each level of the hierarchy, according to the process model 520. The first lines may be directed lines specifying a direction from the disks to the cone, thereby indicating a hierarchical relationship where the cones are at a higher level in a hierarchy than the disks. In the previous described example, an internal product represented by a first cone may include multiple internal components represented by multiple first disks. Further, an external product represented by a second cone may include multiple external components represented by multiple second disks. In this case, some first lines may be rendered connecting the first cone to each of the first disks. Additional first lines may be rendered connecting the second cone to each of the second disks. When the rendering module 518 generates the first lines connecting each cone to the corresponding disks of the cone, the method 100 may proceed to operation 112.

At operation 112, the rendering module 518 may generate a second set of lines (hereinafter referred to as second lines), each of which connects rectangular cuboids representing aggregated products for each level of the hierarchy, according to the process model 520. Each second line may connect from a center of a first rectangular cuboid representing a first aggregated product to a center of a second rectangular cuboid representing a second aggregated product. The second lines may be directed lines specifying a direction from one aggregated product to another aggregated product, thereby indicating dependencies between aggregated products. For example, a given product aggregate may include three aggregated products: a first aggregated product, a second aggregated product, and a third aggregated product. One of the second lines may connect the first aggregated product to the second aggregated product, and further indicate that the first aggregated product is input into the second aggregated product. Another one of the second lines may connect the second aggregated product to the third aggregated product, and further indicate that the second aggregated product is input into the third aggregated product. When the rendering module 518 generates the second lines connecting rectangular cuboids representing aggregated products, the method 100 may proceed to operation 114.

At operation 114, the rendering module 518 may generate a third set of lines (hereinafter referred to as third lines) connecting rectangular cuboids representing product aggregates for each level of the hierarchy, according to the process model 520. Each third line may connect a cone arranged on a face (e.g., a right facing face) of a first rectangular cuboid representing a first product aggregate to a cone arranged on a face (e.g., a left facing face) of a second rectangular cuboid representing a second product aggregate. The third lines may be directed lines specifying a direction from one product aggregate to another product aggregate, thereby indicating dependencies between product aggregates. For example, process model 520 may include a first product aggregate, a second product aggregate, and a third product aggregate. One of the third lines may connect the third product aggregate to the second product aggregate, and further indicate that the third product aggregate is input into the second product aggregate. Another one of the third lines may connect the second product aggregate to the first product aggregate, and further indicate that the second product aggregate is input into the first product aggregate. When the rendering module 518 generates the third lines connecting rectangular cuboids representing product aggregates, the method 100 may proceed to operation 116.

At operation 116, the rendering module 518 may generate a fourth set of lines (hereinafter referred to as fourth lines) connecting disks and rectangular cuboids representing components for each level of the hierarchy, according to the process model 520. The fourth lines may be directed lines specifying a direction from a disk to a component, thereby indicating dependencies between the disk and the component. For example, a first disk may represent an internal component which is a component of an internal product. A second disk may represent an external component which is a component of an external product. Further, a first rectangular cuboid may represent a first component, and a second rectangular cuboid may represent a second component. In this case, one of the fourth lines may connect the internal component to the first component, and further indicate that the internal component is input into the first component. Another one of the fourth lines may connect the external component to the second component, and further indicate that the external component is input into the second component. When the rendering module 518 generates the fourth lines connecting disks and rectangular cuboids representing components, the method 100 may proceed to operation 118.

At operation 118, the rendering module 518 may generate a layout of a three dimensional display arranging display features rendered in operations 104-116. These display features include the first three-dimensional shapes (e.g. rectangular cuboids), the second three-dimensional shapes (e.g., cones), the third three-dimensional shapes (e.g., disks), first lines, second lines, third lines, and/or fourth lines. The layout may be a force-directed layout, according to some embodiments.

When generating the three-dimensional display, the rendering module 518 may be configured to (a) determine dimensions of each of the rectangular cuboids, (b) arrange rectangular cuboids representing aggregated products, (c) arrange cones and disks associated with internal products and internal components on each corresponding rectangular cuboid, (d) arrange cones and disks associated with external products and external components on each corresponding rectangular cuboid, and/or (e) arrange cones and disks associated with component inputs and component products on each corresponding rectangular cuboid, and/or (f) arrange rectangular cuboids representing product aggregates in a specified order. Additional details regarding the operation 118 will be described below with reference to FIG. 2. When the rendering module 518 generates a three dimensional display containing display features rendered in operations 104-116, the method 100 may terminate.

Figure 2:
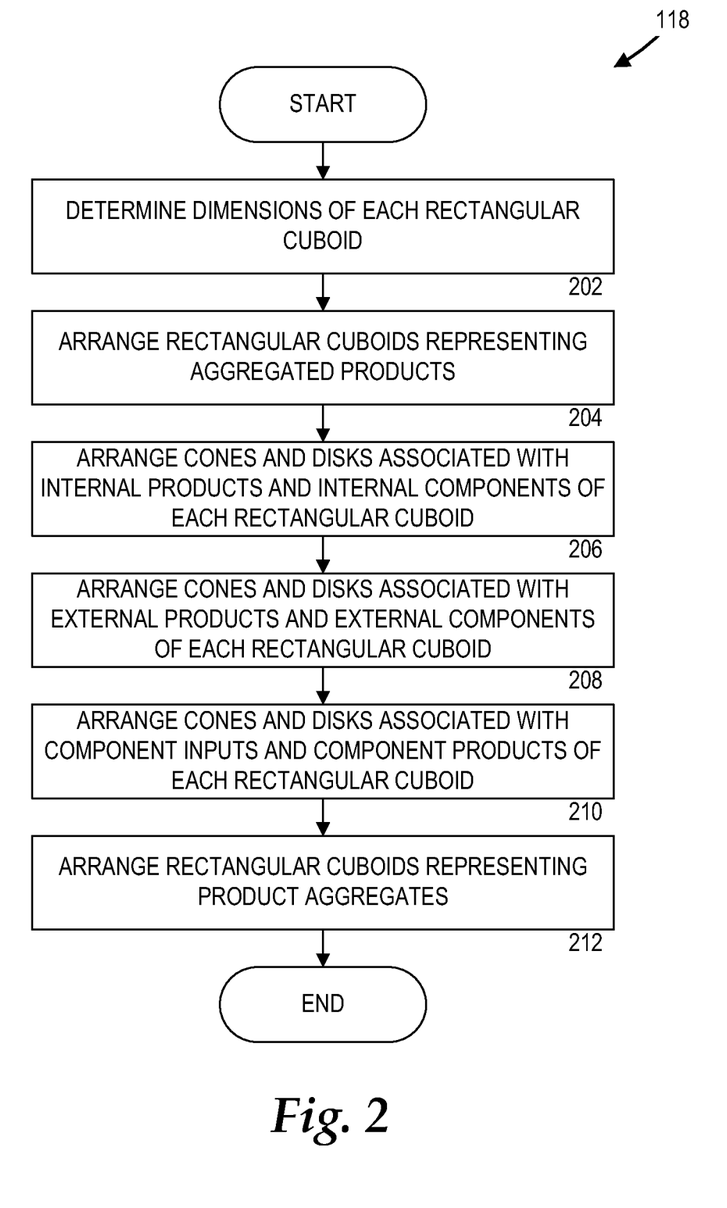
FIG. 2 is a flow diagram illustrating an example method for generating a layout of the three-dimensional display.

Referring now to FIG. 2, a flow diagram illustrating an example method 118 provided herein for generating a layout of a three-dimensional display is shown, in accordance with some embodiments. The method 118 may begin at operation 202, where the rendering module 518 may determine dimensions of the rectangular cuboids based on content contained in the rectangular cuboids for each level of the hierarchy. In some embodiments, the dimensions of a rectangular cuboid representing a product aggregate may be configured in order to ensure a minimum or specified spatial separation of multiple rectangular cuboids representing the aggregated products. As described in greater detail below, the multiple rectangular cuboids representing the aggregated products may be suspended within the interior space of the rectangular cuboid representing the product aggregate. For example, a rectangular cuboid representing the product aggregate may be widened and/or lengthened such that the shape and volume of the rectangular cuboid are sufficient in order to arrange multiple rectangular cuboids representing the aggregated products in a particular arrangement.

In some other embodiments, the dimensions of a rectangular cuboid may be configured in order to ensure a minimum or specified spatial separation of cones and disks corresponding to the rectangular cuboid. As described in greater detail below, the cones and disks may be arranged on one or more faces of the rectangular cuboid. For example, the rectangular cuboid representing the product aggregate may be widened and/or lengthened such that the area on the faces of the rectangular cuboids is sufficient to arrange the cones and disks. When the rendering module 518 determines dimensions of the rectangular cuboids based on content contained in the rectangular cuboids, the method 118 may proceed to operation 204.

At operation 204, the rendering module 518 may arrange rectangular cuboids representing aggregated products within a rectangular cuboid representing the product aggregate according to a particular arrangement for each level of the hierarchy. In some embodiments, the rectangular cuboids representing aggregated products may be suspended within the interior, three-dimensional space of the rectangular cuboid representing the product aggregate. In some other embodiments, rectangular cuboids representing aggregated products may be arranged in a logical arrangement consistent with the second lines connecting the rectangular cuboids. For example, the second lines may indicate that a first aggregated product is input into a second aggregated product, which is further input into a third aggregated product. In this case, the second aggregated product may be arranged adjacent to the first aggregated product, and the third aggregated product may be arranged adjacent to the second aggregated product.

The first, second, and third aggregated product may be further arranged in a side-by-side configuration. In this way, the second lines can be rendered as straight lines without any curved lines. When the rendering module 518 arranges rectangular cuboids representing aggregated products within a rectangular cuboid representing the product aggregate according to a particular arrangement, the method 118 may proceed to operation 206.

At operation 206, the rendering module 518 may arrange cones and disks associated with internal products and internal components on a first face of each corresponding rectangular cuboid for each level of the hierarchy. This first face may be referred to as an input face. For example, the internal products, each of which contains corresponding internal components, may be utilized or required for the production of a product aggregate represented by a rectangular cuboid. In this case, the cones and disks representing these internal products and internal components may be arranged on a face of the rectangular cuboid representing the product aggregate. The cones and disks may be arranged in a star formation, in which a cone is arranged at the center of the star, and the corresponding disks are arranged around the cone in a circular arrangement. The first lines may connect the cones with the corresponding disks. When the rendering module 518 arranges cones and disks associated with internal products and internal components on at least one face of each corresponding rectangular cuboid, the method 118 may proceed to operation 208.

At operation 208, the rendering module 518 may arrange cones and disks associated with external products and external components on a second face of each corresponding rectangular cuboid for each level of the hierarchy. This second face may be referred to as an external input face. For example, the external products, each of which contains corresponding external components, may be utilized or required for the production of a product aggregate represented by a rectangular cuboid. In this case, the cones and disks representing these external products and external components may be arranged on a face of the rectangular cuboid representing the product aggregate. The cones and disks may be arranged in a star formation, which a cone is arranged at the center of the star, and the corresponding disks are arranged around the cone in a circular arrangement. The first lines may connect the cones with the corresponding disks. When the rendering module 518 arranges cones and disks associated with external products and external components on at least one face of each corresponding rectangular cuboid, the method 118 may proceed to operation 210.

At operation 210, the rendering module 518 may arrange cones and disks associated with component inputs and component products on a third face of each corresponding rectangular cuboid for each level of the hierarchy. This third face may be referred to as an output face. For example, the component inputs, each of which contains corresponding component products, may be utilized or required for the production of a product aggregate represented by a rectangular cuboid. In this case, the cones and disks representing these component inputs and component products may be arranged on a face of the rectangular cuboid representing the product aggregate. The cones and disks may be arranged in a star formation, which a cone is arranged at the center of the star, and the corresponding disks are arranged around the cone in a circular arrangement. The first lines may connect the cones with the corresponding disks. When the rendering module 518 arranges cones and disks associated with component inputs and component products on at least one face of each corresponding rectangular cuboid, the method 118 may proceed to operation 212.

At operation 212, the rendering module 518 may arrange rectangular cuboids representing product aggregates in a sequential order for each level of the hierarchy. For example, the third lines may indicate that a first rectangular cuboid representing a first product aggregate is input into a second rectangular cuboid representing second product aggregate. The second rectangular cuboid representing the second product aggregate may be input into a third rectangular cuboid representing a third product aggregate. In this case, the second rectangular cuboid may be arranged adjacent to the first rectangular cuboid, and the third rectangular cuboid may be arranged adjacent to the second rectangular cuboid. The first, second, and third rectangular cuboids may be further arranged in a side-by-side configuration. In this way, the third lines can be rendered as straight lines without any curved lines. When the rendering module 518 arranges rectangular cuboids representing product aggregates in a sequential order, the method 118 may terminate.

Figure 3:
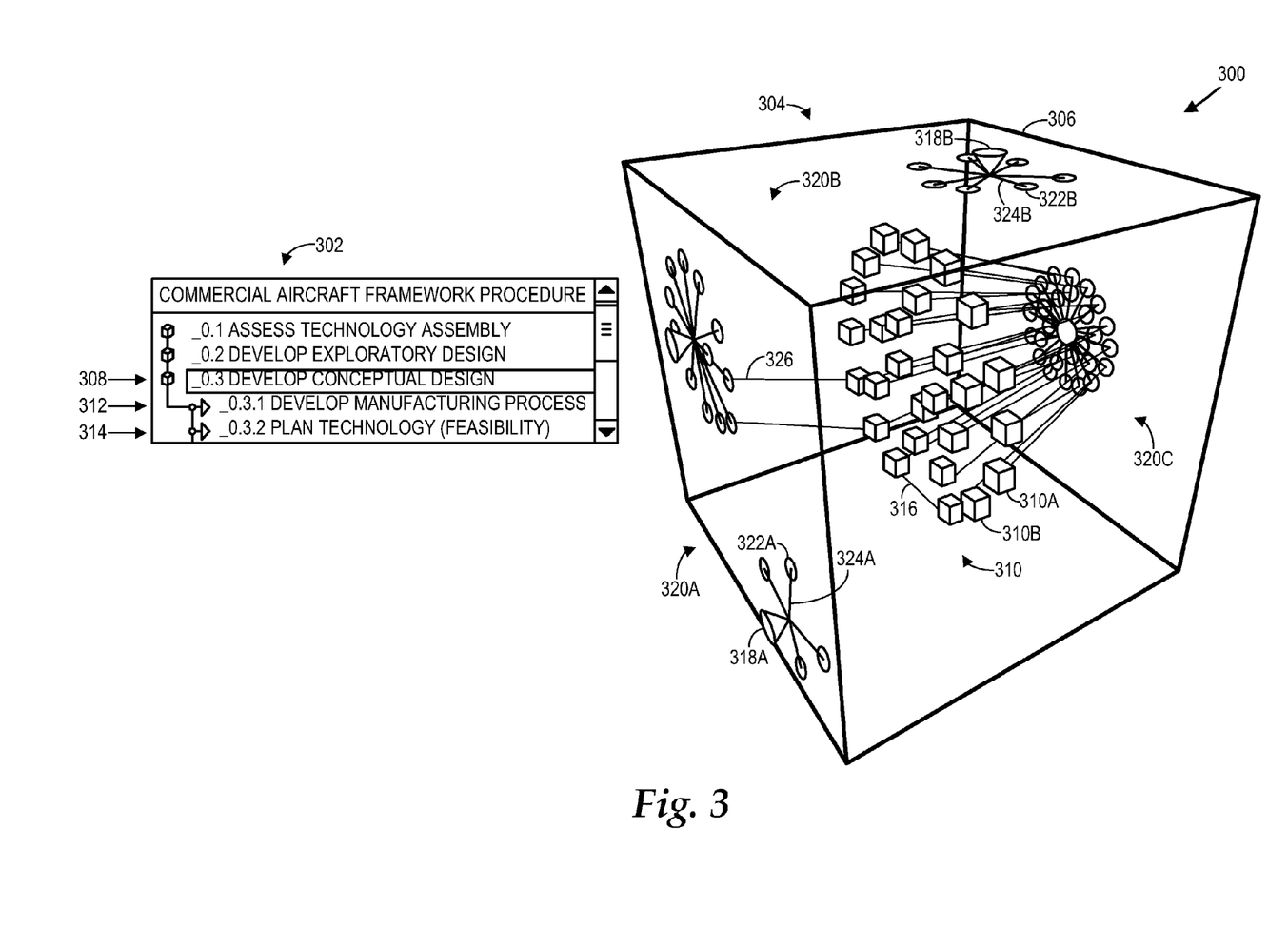
FIG. 3 is a screen display diagram showing an example three-dimensional display of an aggregate component, in accordance with some embodiments.

Referring now to FIG. 3, a screen display diagram 300 illustrating an example three-dimensional display of a product aggregate is shown, in accordance with some embodiments. The screen display diagram 300 may include a user interface menu 302 and a three-dimensional display 304. A user may access the user interface menu 302 using a suitable pointing device, such as a mouse or touchpad. The rendering module 518 may render the three-dimensional display 304 by executing at least a portion of the methods 100 and 118 as illustrated in FIGS. 1 and 2, respectively.

As illustrated in FIG. 3, the three-dimensional display 304 may include an aggregate cuboid 306 representing a product aggregate. For example, the product aggregate represented by the aggregate cuboid 306 may correspond to a process for developing a conceptual design of a commercial aircraft, as illustrated at 308. The aggregate cuboid 306 may include multiple component cuboids 310, such as component cuboids 310A and 310B, representing aggregated products of the product aggregate. For example, the component cuboid 310A may correspond to a process for developing manufacturing processes, as illustrated at 312. Further, the component cuboid 310B may correspond to a process for determining a feasibility of plan technology, as illustrated at 314. The component cuboids 310 may represent components of the product aggregate represented by the aggregate cuboid 306. The component cuboids 310 may be suspended within the three-dimensional space of the aggregate cuboid 306. Second lines, such as a second line 316, may connect various component cuboids 310.

The aggregate cuboid 306 may further include cones, such as a first cone 318A and a second cone 318B. The first cone 318A may be arranged on a first face 320A, which is the input face, of the aggregate cuboid 306. The second cone 318B may be arranged on a second face 320B, which is the external input face, of the aggregate cuboid 306. The first cone 318A may correspond to an internal product that is utilized or required for the production of the product aggregate represented by the aggregate cuboid 306. The internal product may include multiple internal components. Each internal component may be represented by a disk, such as a disk 322A. First lines, such as a first line 324A, may connect the first cone 318A to the corresponding disks, such as the disk 322A. The second cone 318B may correspond to an external product that is utilized or required for the production of the product aggregate represented by the aggregate cuboid 306. The external product may include multiple external components. Each external component may be represented by a disk, such as disk 322B. First lines, such as a first line 324B may connect the second cone 318B to the corresponding disks, such as the disk 322B. Fourth lines, such a fourth line 326, may connect the disks to the rectangular cuboids representing the components. An additional cone and additional disks may be arranged on a third face 320C, which is the output face, of the aggregate cuboid 306.

In some embodiments, the rendering module 518 may provide a user interface with which the user can interact with the three-dimensional display 304. The user may utilize the pointing device to interact with the three-dimensional display 304. For example, the user may utilize the pointing device to rotate the view of the aggregate cuboid 306. The user may utilize the pointing device to zoom in on one of the component cuboids 310. The user interface may also animate the three-dimensional display 304.

In some embodiments, the user interface may indicate errors as well as incomplete and/or invalid modeling states. For example, a color, such as red, may indicate an error. In this case, a red rectangular cuboid may indicate that a product contains no inputs, which is an error. A red disk on the output face may indicate an unused output, which is an error unless the output is an end product. A red cone may indicate an aggregate input, none of whose component products are used as input, which is an error.

In some embodiments, the user interface may also provide the user various feedback based on the user's gestures via the pointing device. For example, feedback may be utilized to indicate proper drag and drop operation. When a user drags from a component to another component to be used as input, an edge may appear indicating a connection. When the user hovers a cursor over another component, a pop-over window may appear containing the identifier name of the component. If the component is allowed as an input, the cursor may change to an icon indicating a drop is acceptable. If the component is not allowed as an input, the cursor may change to an icon indicating a drop is unacceptable.

Figure 4:
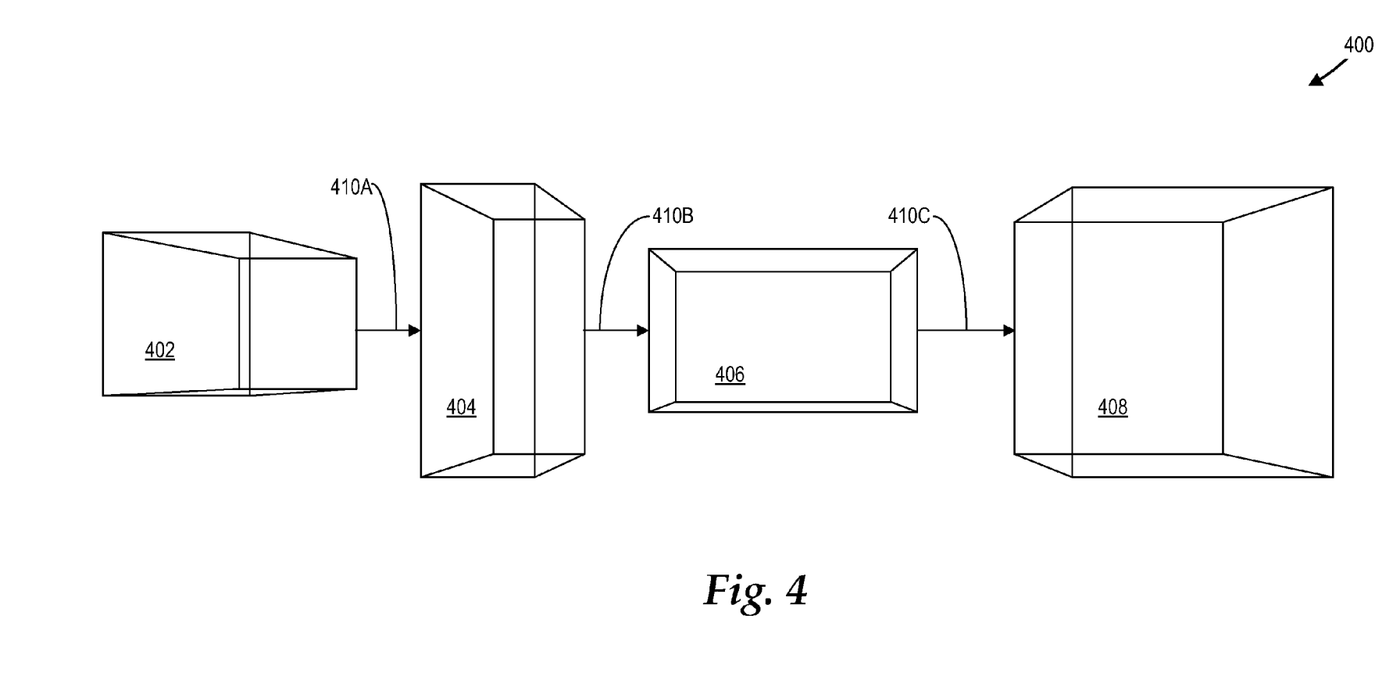
FIG. 4 is a screen display diagram showing an example three-dimensional display of multiple aggregate components, in accordance with some embodiments.

Referring now to FIG. 4, a screen display diagram 400 illustrating an example three-dimensional display of multiple product aggregates is shown, in accordance with some embodiments. The screen display diagram 400 may include a first cuboid 402, a second cuboid 404, a third cuboid 406, and a fourth cuboid 408. The first cuboid 402 may represent a first product aggregate, and the second cuboid 404 may represent a second product aggregate. The third cuboid 406 may represent a third product aggregate, and the fourth cuboid 408 may represent a fourth product aggregate. As illustrated in FIG. 4, each of the cuboids 402-408 may be configured in different dimensions in accordance with the content contained in the cuboids 402-408. It should be appreciated that the cuboids 402-408 are simplified and do not contain details of the content within the cuboids 402-408. Some other implementations may render the cuboids 402-408 with similar detail as the aggregate cuboid 306 shown in FIG. 3.

The screen display diagram 400 may include third lines 410A, 410B, 410C (collectively referred to as third lines 410). The third line 410A may connect cones on the face of the first cuboid 402 to cones on the face of the second cuboid 404 and further indicate that the first cuboid 402 is input into the second cuboid 404. The third line 410B may connect cones on the face of the second cuboid 404 and cones on the face of the third cuboid 406 and further indicate that the second cuboid 404 is input into the third cuboid 406. The third line 410C may connect cones on the face of the third cuboid 406 and cones on the face of the fourth cuboid 408 and further indicate that the third cuboid 406 is input into the fourth cuboid 408.

Referring now to FIG. 5, an example computer architecture diagram showing a computer 500 is illustrated. The computer 500 may include a central processing unit 502, a system memory 504, and a system bus 506 that couples the memory 504 to the 502. The computer 500 may further include a mass storage device 512 for storing one or more program modules 514 and a data store 516. An example of the program modules 514 may include the rendering module 518. The data store 516 may store the process model 520 and/or other relevant data. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as a network 522. The computer 500 may connect to the network 522 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including, but not limited to, semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to generate a three-dimensional display of input specifications in a scalable, nested feed-forward network. The program modules 514 may also provide various tools or techniques by which the computer 500 may participate within the overall systems or operating environments using the components, flows, and data structures discussed throughout this description. For example, the program modules 514 may implement interfaces for generating a three-dimensional display of input specifications in a scalable, nested feed-forward network.

In general, the program modules 514 may, when loaded into the processing unit 502 and executed, transform the processing unit 502 and the overall computer 500 from a general-purpose computing system into a special-purpose computing system customized to generate a three-dimensional display of input specifications in a scalable, nested feed-forward network. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for generating a three-dimensional display of input specifications in a scalable, nested feed-forward network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for generating a three-dimensional display, the method comprising computer-implemented operations for:
    retrieving a model defining a feed-forward network related to a development process;
    generating a first three-dimensional shape representing each internal product according to the model;
    generating a second three-dimensional shape representing each dependency of each internal product corresponding to each first three-dimensional shape;
    generating a third three-dimensional shape representing each component of each dependency corresponding to each second three-dimensional shape; and
    generating a layout of the three-dimensional display by
        determining dimensions of each first three-dimensional shape,
        arranging the first three-dimensional shapes representing aggregated products within the first three-dimensional shape representing the product aggregate,
        arranging the second three-dimensional shapes and the third three-dimensional shapes associated with internal products and internal components utilized in production of the internal products for each corresponding first three-dimensional shape,
        arranging the second three-dimensional shapes and the third three-dimensional shapes associated with external products and external components utilized in production of the external products for each corresponding first three-dimensional shape,
        arranging the second three-dimensional shapes and the third three-dimensional shapes with component inputs and component products utilized in production of the component inputs for each corresponding first three-dimensional shape, and
        arranging the first three-dimensional shapes representing product aggregates by suspending the first three-dimensional shapes representing aggregated products within an interior space of the first three-dimensional shape representing the product aggregate.

2. The computer-implemented method of claim 1, wherein the first three-dimensional shape comprises a rectangular cuboid.

3. The computer-implemented method of claim 1, wherein each internal product comprises a product aggregate or a aggregated product.

4. The computer-implemented method of claim 1, wherein the second three-dimensional shape comprises a cone.

5. The computer-implemented method of claim 1, wherein the third three-dimensional shape comprises a disk-shaped cylinder.

6. The computer-implemented method of claim 1, further comprising computer-implemented operations for:
    generating first lines connecting each second three-dimensional shape to the corresponding third three-dimensional shapes;
    generating second lines connecting the first three-dimensional shapes representing product aggregates;
    generating third lines connecting the first three-dimensional shapes representing aggregated products; and
    generating fourth lines connecting the first three-dimensional shapes to the third three-dimensional shapes.

7. A system for generating a three-dimensional display, the system comprising:
    a processor;

a memory coupled to the processor; and
a program module which executes in the processor from the memory and which, when executed by the processor, causes the system to generate the three-dimensional display by
retrieving a model defining a feed-forward network related to a development process;
generating a rectangular cuboid representing each internal product according to the model;
generating a cone representing each dependency of each internal product corresponding to each rectangular cuboid;
generating a disk-shaped cylinder representing each component of each dependency corresponding to each cone; and
generating a layout of the three-dimensional display by determining dimensions of each rectangular cuboid,
arranging the rectangular cuboids representing aggregated products within the rectangular cuboid representing the product aggregate,
arranging the cones and the disk-shaped cylinders associated with internal products and internal components utilized in production of the internal products for each corresponding rectangular cuboid,
arranging the cones and the disk-shaped cylinders associated with external products and external components utilized in production of the external products for each corresponding rectangular cuboid,
arranging the cones and the disk-shaped cylinders with component inputs and component products utilized in production of the component inputs for each corresponding rectangular cuboid, and
arranging the rectangular cuboids representing product aggregates by suspending the rectangular cuboids representing aggregated products within an interior space of the rectangular cuboids representing the product aggregate.

8. The system of claim 7, wherein each internal product comprises a product aggregate or an aggregated product.

9. The system of claim 7, wherein the program module, when executed by the processor, further causes the system to generate the three-dimensional display by
generating first lines connecting each cone to the corresponding disk-shaped cylinders;
generating second lines connecting the rectangular cuboids representing product aggregates;
generating third lines connecting the rectangular cuboids representing aggregated products; and
generating fourth lines connecting the rectangular cuboids to the disk-shaped cylinders.

10. The system of claim 7, wherein arranging the cones and the disk-shaped cylinders associated with internal products and internal components utilized in production of the internal products for each corresponding rectangular cuboid comprises arranging the cones and the disk-shaped cylinders associated with internal products and internal components utilized in production of the internal products on a first face of each corresponding rectangular cuboid;
wherein arranging the cones and the disk-shaped cylinders associated with external products and external components utilized in production of the external products for each corresponding rectangular cuboid comprises arranging the cones and the disk-shaped cylinders associated with external products and external components utilized in production of the external products on a second face of each corresponding rectangular cuboid; and
wherein arranging the cones and the disk-shaped cylinders with component inputs and component products utilized in production of the component inputs for each corresponding rectangular cuboid comprises arranging the cones and the disk-shaped cylinders with component inputs and component products utilized in production of the component inputs on a third face of each corresponding rectangular cuboid.

11. The system of claim 7, wherein arranging the rectangular cuboids representing aggregates comprises arranging the rectangular cuboids representing product aggregates in a sequential order.

12. A system for generating a three-dimensional display, the system comprising:
a processor;
a memory coupled to the processor; and
a program module which executes in the processor from the memory and which, when executed by the processor, causes the system to generate the three-dimensional display by
retrieving a model defining a feed-forward network related to a development process;
generating a rectangular cuboid representing each internal product according to the model;
generating a cone representing each dependency of each internal product corresponding to each rectangular cuboid;
generating a disk-shaped cylinder representing each component of each dependency corresponding to each cone; and
generating a layout of the three-dimensional display by determining dimensions of each rectangular cuboid;
arranging the rectangular cuboids representing aggregated products within the rectangular cuboid representing the product aggregate;
arranging the cones and the disk-shaped cylinders associated with internal products and internal components utilized in production of the internal products for each corresponding rectangular cuboid by arranging the cones and the disk-shaped cylinders associated with internal products and internal components utilized in production of the internal products on a first face of each corresponding rectangular cuboid;
arranging the cones and the disk-shaped cylinders associated with external products and external components utilized in production of the external products for each corresponding rectangular cuboid by arranging the cones and the disk-shaped cylinders associated with external products and external components utilized in production of the external products on a second face of each corresponding rectangular cuboid;
arranging the cones and the disk-shaped cylinders with component inputs and component products utilized in production of the component inputs for each corresponding rectangular cuboid by arranging the cones and the disk-shaped cylinders with component inputs and component products utilized in production of the component inputs on a third face of each corresponding rectangular cuboid; and
arranging the rectangular cuboids representing product aggregates.

13. A computer-readable storage medium having computer-executable instructions stored thereon which, when executed by a computer, cause the computer to generate a three-dimensional display by:

retrieving a model defining a feed-forward network related to a development process;

generating a rectangular cuboid representing each internal product according to the model, each internal product comprising a product aggregate or an aggregated product;

generating a cone representing each dependency of each internal product corresponding to each rectangular cuboid;

generating a disk-shaped cylinder representing each component of each dependency corresponding to each cone; and generating a layout of the three-dimensional display by
determining dimensions of each rectangular cuboid,
arranging the rectangular cuboids representing aggregated products within the rectangular cuboid representing the product aggregate,
arranging the cones and the disk-shaped cylinders associated with inter products and internal components utilized in production of the internal products for each corresponding rectangular cuboid,
arranging the cones and the disk-shaped cylinders associated with external products and external components utilized in production of the external products for each corresponding rectangular cuboid,
arranging the cones and the disk-shaped cylinders with component inputs and component products utilized in production of the component inputs for each corresponding rectangular cuboid, and
arranging the rectangular cuboids representing product aggregates by suspending the rectangular cuboids representing aggregated products within an interior space of the rectangular cuboid representing the product aggregate.

14. The computer-readable storage medium of claim 13, having further computer-executable instructions stored thereon which, when executed by a computer, cause the computer to generate a three-dimensional display by:

generating first lines connecting each cone to the corresponding disk-shaped cylinders;

generating second lines connecting the rectangular cuboids representing the product aggregates;

generating third lines connecting the rectangular cuboids representing the aggregated products; and generating fourth lines connecting the rectangular cuboids to the disk-shaped cylinders.

* * * * *